United States Patent [19]
Hamblin

[11] Patent Number: 5,993,307
[45] Date of Patent: Nov. 30, 1999

[54] DUAL MACHINES FOR MAKING SAUSAGES AT A SINGLE SAUSAGE MAKING STATION

[75] Inventor: David Hamblin, Norwalk, Iowa

[73] Assignee: Townsend Engineering Company, Des Moines, Iowa

[21] Appl. No.: 08/956,547

[22] Filed: Oct. 23, 1997

[51] Int. Cl.⁶ .................................................. A22C 11/02
[52] U.S. Cl. ................................ 452/35; 452/36; 452/46; 452/177
[58] Field of Search ................................. 452/35, 36, 37, 452/46, 47, 51, 177

[56] References Cited

U.S. PATENT DOCUMENTS

| | | | |
|---|---|---|---|
| 4,940,597 | 7/1990 | Townsend | 452/35 |
| 4,991,260 | 2/1991 | Nausedas | 452/35 |
| 5,073,142 | 12/1991 | Kasai et al. | 452/46 |
| 5,092,813 | 3/1992 | Kasai et al. | 452/46 |
| 5,183,433 | 2/1993 | Townsend et al. | 452/46 |

*Primary Examiner*—Willis Little
*Attorney, Agent, or Firm*—Zarley, McKee, Thomte, Voorhees & Sease

[57] ABSTRACT

A meat encasing machine has a meat emulsion pump in communication with a stuffing tube which terminates in a twister housing adjacent a linker. A stuffing tube with power means associated with the twister housing rotates a strand of sausage extruded from the stuffing tube. A motor is provided for rotating the looper horn. The motor associated with the twister housing is adapted to rotate the sausage strand in either a clockwise or counterclockwise direction, and the motor associated with the looper horn is adapted to rotate the looper horn in either a clockwise or counterclockwise direction. The foregoing structure is used in sausage making machines arranged in a sausage making station comprised of pairs of machines and conveyors arranged in spaced parallel positions to create a mirror image of each other.

13 Claims, 5 Drawing Sheets

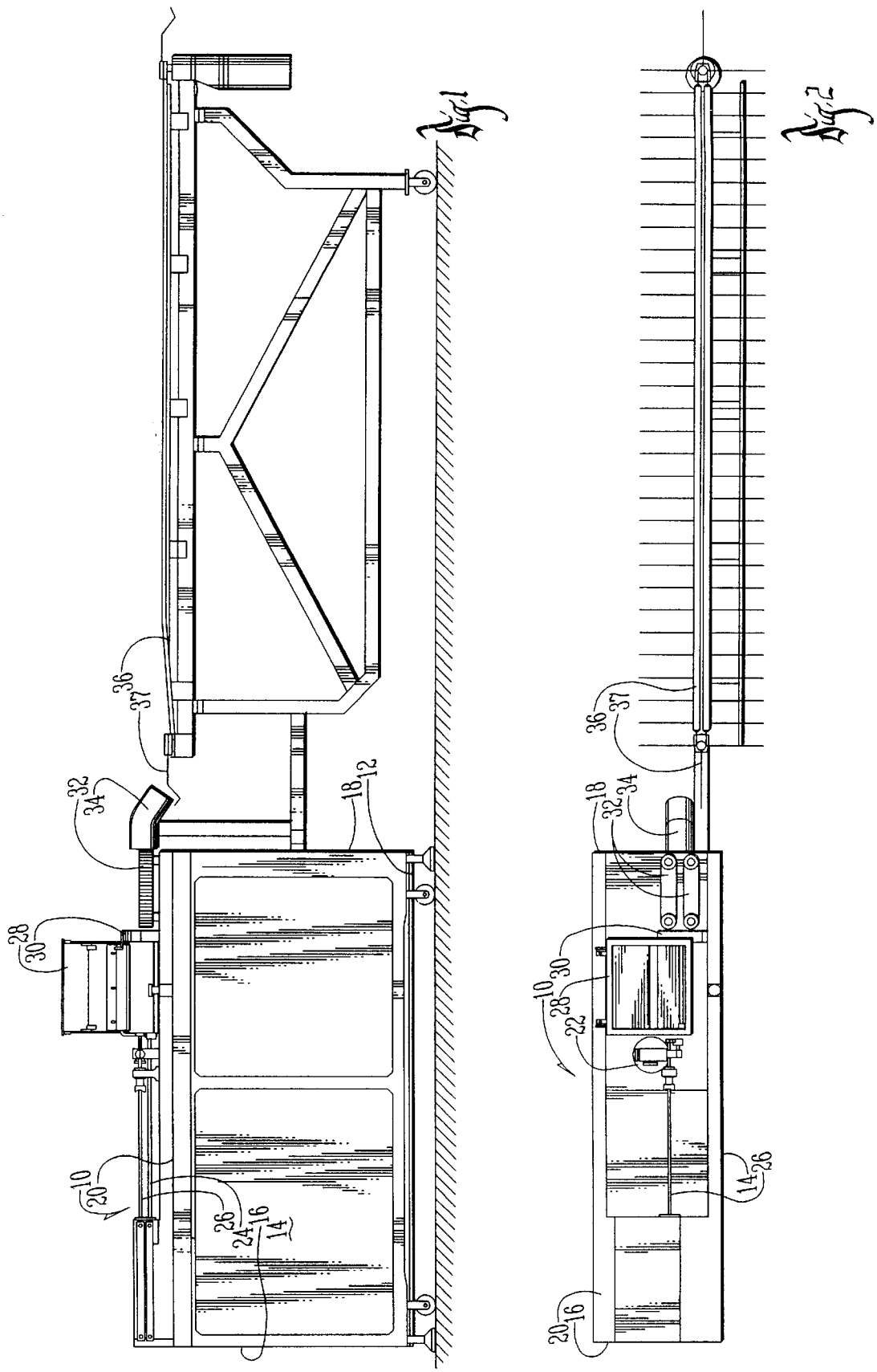

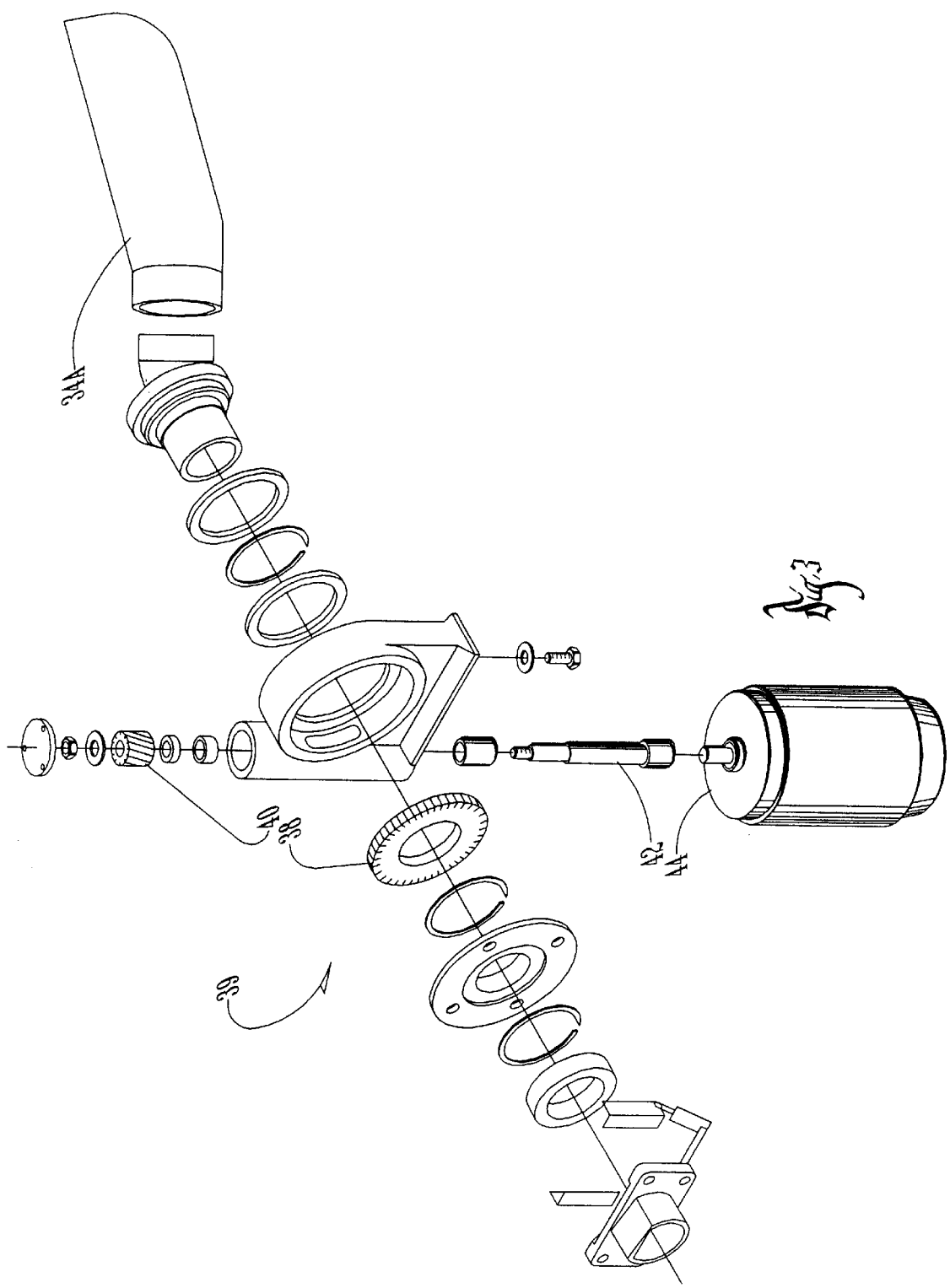

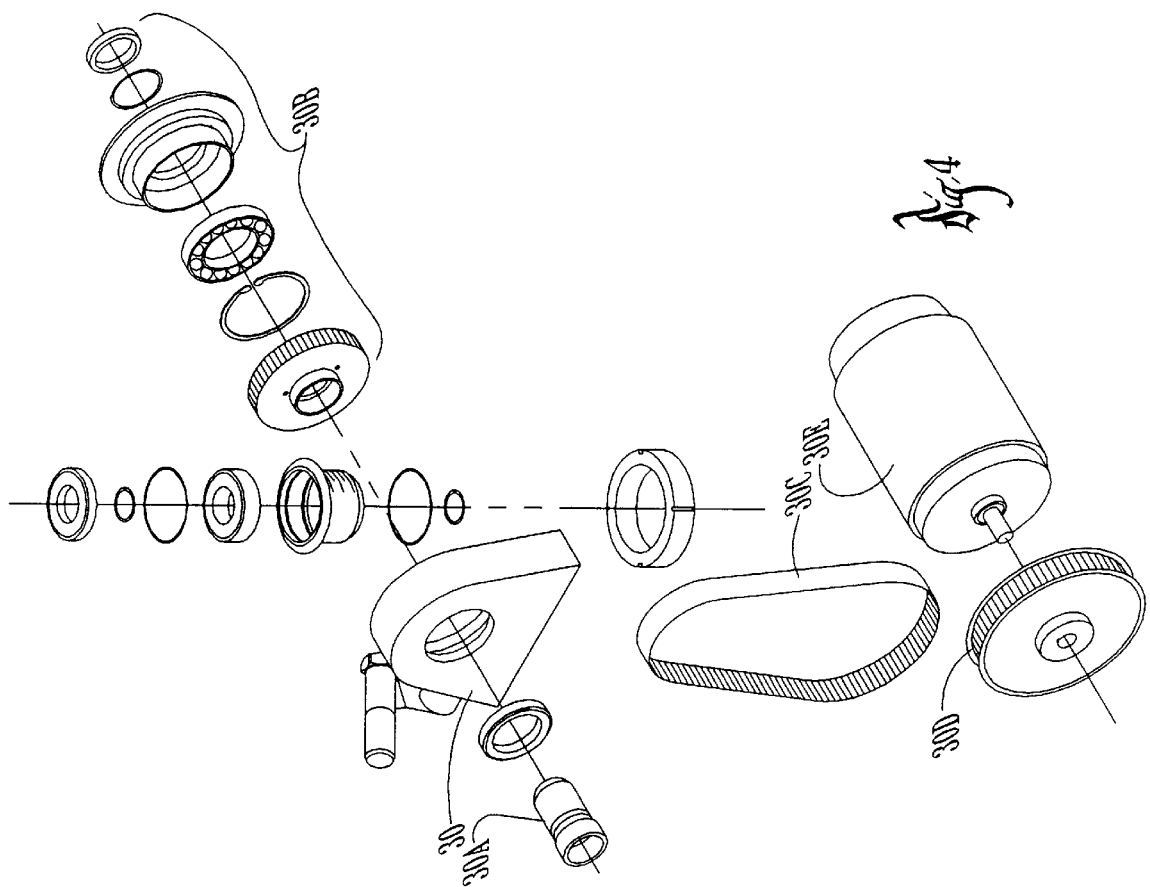

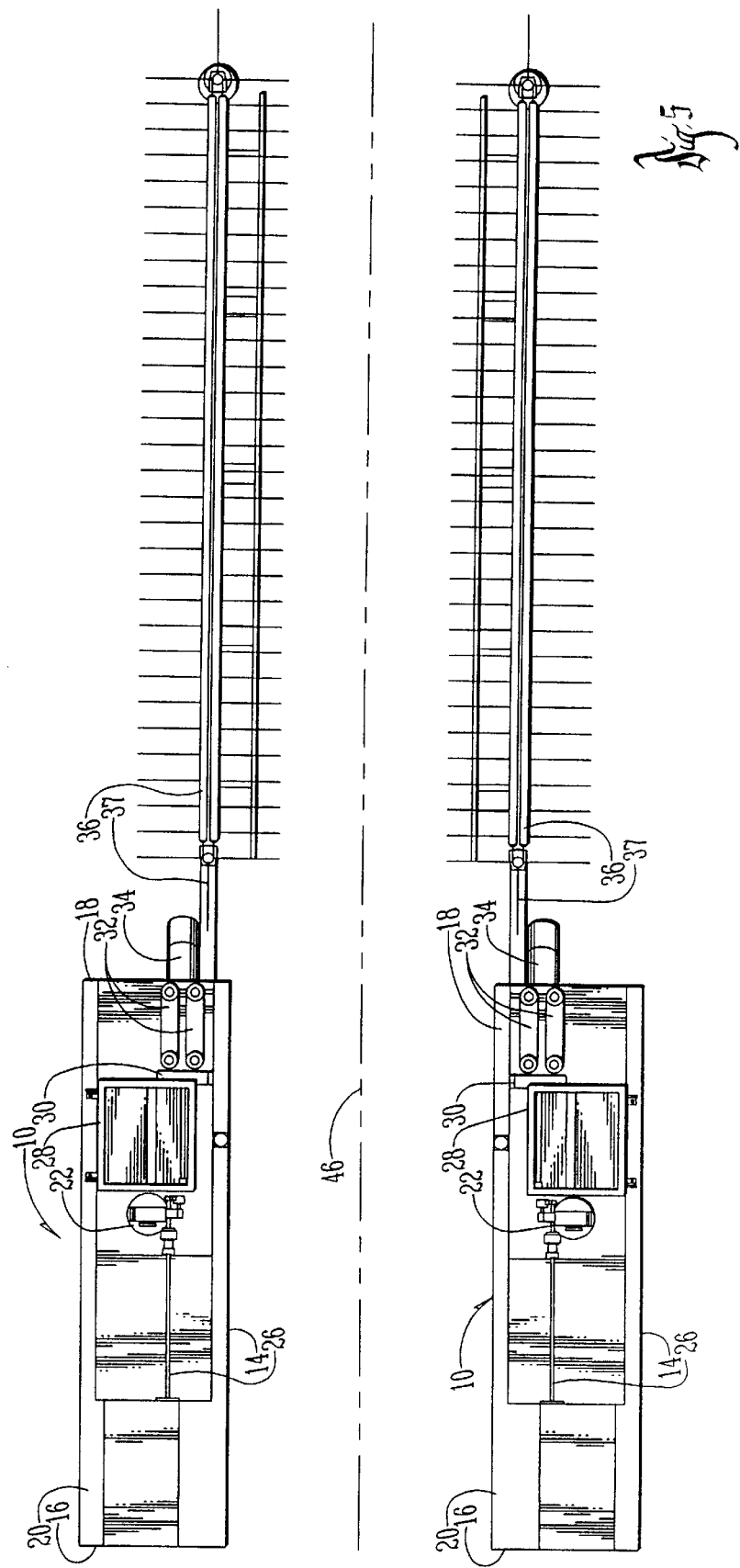

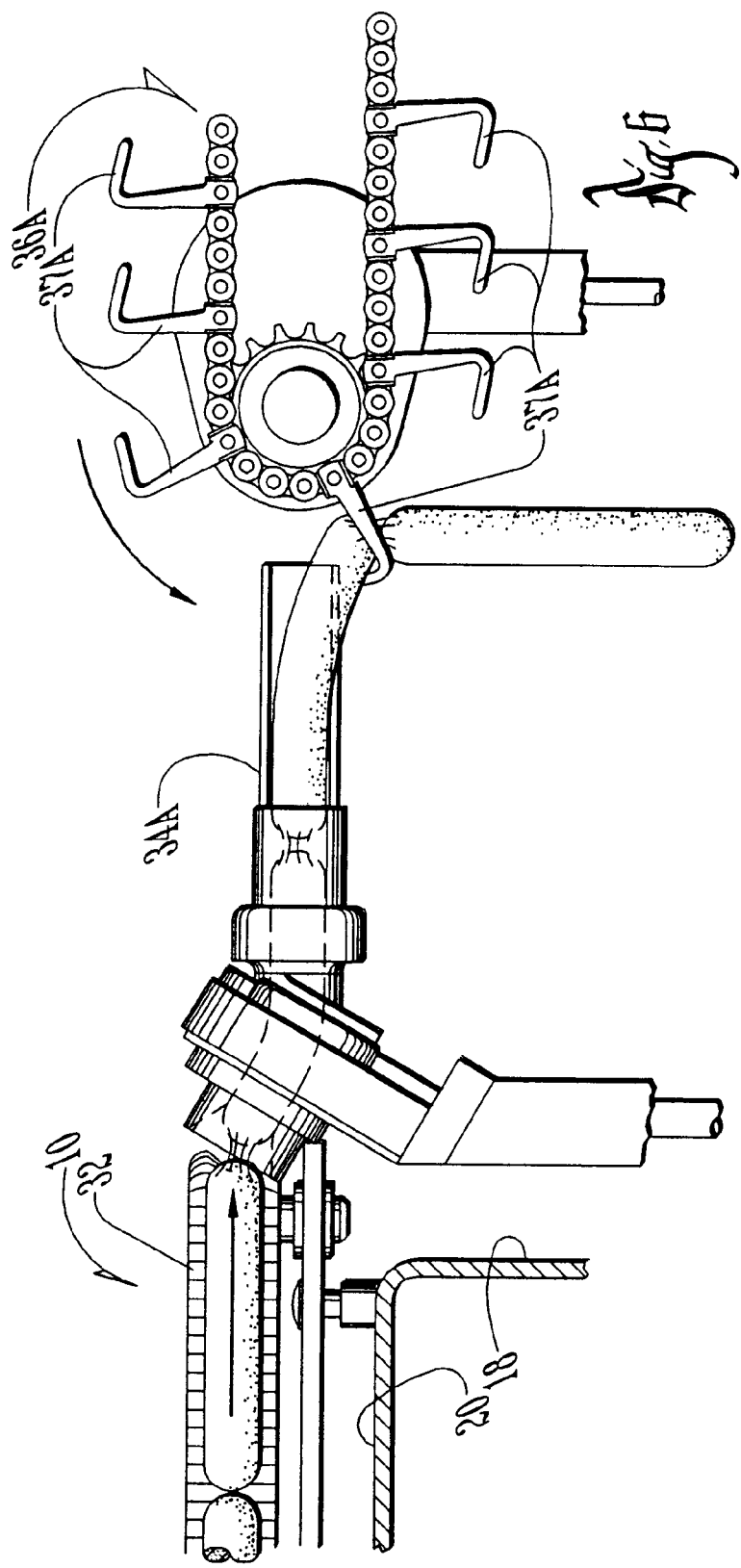

1

DUAL MACHINES FOR MAKING SAUSAGES AT A SINGLE SAUSAGE MAKING STATION

BACKGROUND OF THE INVENTION

Sausage making machines such as that shown in U.S. Pat. No. 3,115,668 include a meat emulsion pump connected to an elongated stuffing tube which extrudes into a shirred casing thereon a strand of sausage into the rotatable chuck of a twister housing. The strand then moves through a conventional linker and the linked strand discharged therefrom typically moves into a rotatable looper horn and deposits on the hooks of a moveable conveyor.

It would be advantageous to use such machines in spaced parallel relationship, to be attended by a single operator. However, conventional sausage making machines do not make this possible because the chuck and the looper horn can only be rotated in a single direction.

It is therefore the principal object of this invention to provide a sausage making machine which has power means associated with both the twister housing and the looper horn to permit the chuck in the twister housing and/or the looper horn to be rotated in both clockwise or counterclockwise directions.

SUMMARY OF THE INVENTION

A device for encasing and linking sausages has a meat emulsion pump in communication with a stuffing tube which terminates in a twister housing adjacent a linking means. The stuffing tube extrudes a strand of sausage into a casing which goes through the twister housing. A first power means associated with the twister housing is adapted to rotate the sausage strand in either a clockwise or counterclockwise direction, and a second power means associated with the looper horn is adapted to rotate the looper horn in either a clockwise or counterclockwise direction. The foregoing structure is used in sausage making machines arranged in a sausage making station comprised of pairs of machines and conveyors arranged in spaced parallel positions to effectively create a mirror image of each other.

DESCRIPTION OF THE DRAWINGS

FIG. 1 is a side elevational view of the device of this invention;

FIG. 2 is a plan view thereof;

FIG. 3 is an exploded view of the looper horn assembly;

FIG. 4 is an exploded view of the rotatable twister housing and chuck;

FIG. 5 is a plan view similar to FIG. 2 but shows two machines of this invention in a mirror positioned relationship; and FIG. 6 is a partial side elevational view of a conventional form of rotating looper horn and vertical conveyor.

DESCRIPTION OF THE PREFERRED EMBODIMENT

The numeral 10 comprises a sausage linker machine having a frame 12 which is comprised of front 14, ends 16 and 18, and top 20.

A conventional emulsion pump 22 is mounted on frame 12 and is in communication with a conventional hollow elongated stuffing tube 26 through which the meat emulsion is moved by pump 22. An elongated follower arm 24 is mounted on the top of frame 12. A casing hopper 28 is mounted on the top of frame 12. A twister housing 30 having a rotatable chuck 30A is mounted adjacent the discharge end of stuffing tube 26. A conventional set of linking chains 32 is mounted on frame 12 immediately downstream from twister housing 30. Linked sausages move conventionally from the linking chains 32 through a horn 34 onto a conveyor 36 having hooks 37. The looper horn 34 does not rotate. FIG. 6 shows a horn 34A which does rotate and which functions with a vertical conveyor 36A which has hooks 37A.

With reference to FIG. 4 the twister housing 30 is adapted to receive rotatable chuck 30A in its center bore which is operatively rotated by the belt assembly 30B, belt 30C and drive member 30D which in turn is operatively connected to reversible motor 30E. An extruded strand of encased sausage from stuffing tube 26 enters conventional chuck 30A and is rotated or twisted by the rotational motion of the chuck. The motor 30E is reversible so as to permit the selective rotation of the chuck 30A in either a clockwise or counterclockwise direction.

With reference to FIG. 3, the looper horn 34A is supported by a housing assembly 39 which includes gears 38 and 40 operatively connected to rotatable shaft 42 which is operatively connected to reversible motor 44. The motor 44 is manually reversible so that the looper horn 34 can be selectively rotated in either a clockwise or counterclockwise direction. The looper horn 34A is more specifically described in U.S. Pat. No. 5,183,433 which is incorporated herein by reference.

The reversible motors of this invention permit the mirror-image relationship of two machines and two conveyors to be used in side by side relationship at a single sausage making station to be attended from a position 46 by a single person, robot, etc. (FIG. 5). The casing hoppers 26 can each be loaded from a position outside the space between the machines 10 and conveyors 26. The machine 10 and conveyor 36A of FIG. 6 are also adapted to be used in the mirror image configuration of FIG. 5.

Power means (not shown) are adapted to rotate the conveyors 36 (FIG. 5) in opposite directions. Conveyor 36A of FIG. 6 rotates in only a single direction.

It should be noted that if a pair of machines are custom made to have looper horns 34A and chucks 30 which are fixed to rotate in a clockwise direction in conjunction with a machine which is custom made to rotate such parts in a counter-clockwise direction, it would not be necessary to have reversible motion.

It is therefore seen that this invention will achieve its stated objective.

What is claimed is:

1. A conveyor station for a pair of closely spaced sausage producing machines, comprising, a pair of spaced substantially parallel sausage producing machines capable of discharging a rope of sausages through a discharge end thereof, a pair of spaced elongated substantially parallel conveyors having one end of each adjacent the discharge ends of said machines, with said conveyors having adjacent sides;

said conveyors having a continuous conveyor assembly adapted to pick up and carry away the rope of sausage discharged from each machine, power means for rotating said conveyor assemblies in opposite directions, said conveyors being a mirror image of each other as viewed from above so as to permit each conveyor to be attended by a single operator from an operating position in the space between said conveyors, and said machines being a mirror image of each other as viewed from above.

2. The conveyor station of claim 1 wherein said sausage producing machines each have a chuck within a twister housing adjacent a linking means, a power means associated with said twister housing and said chuck being adapted to rotate said sausage strand in either a clockwise or counter-clockwise direction.

3. The conveyor station of claim 1 wherein said sausage producing machines each have a chuck within a twister housing adjacent a linking means, a stuffing tube, power means associated with said twister housing for rotating a strand of sausage extruded from said stuffing tube, and a looper horn located downstream from said linking means and adapted to deposit said strand on the hooks of a sausage conveyor, power means associated with said looper horn and being adapted to rotate the looper horn in either a clockwise or counter-clockwise direction.

4. The conveyor station of claim 1 wherein said sausage producing machines have a chuck within a twister housing adjacent a linking means, a stuffing tube with power means associated with said twister housing for rotating a strand of sausage extruded from said stuffing tube, and a looper horn located downstream from said linking means and adapted to deposit said strand on the hooks of a sausage conveyor, power means associated with said looper horn and being adapted to rotate the looper horn in either a clockwise or counterclockwise direction, the power means associated with said twister housing and said chuck being adapted to rotate said sausage strand in either a clockwise or counterclockwise direction.

5. The conveyor station of claim 1 wherein said sausage producing machines each have a chuck within a twister housing adjacent a linking means, power means associated with the twister housing and chuck of each machine wherein the twister housing and chuck on one machine can rotate only in a clockwise direction, and the twister housing and chuck in the other machine can rotate only in a counter-clockwise direction.

6. The conveyor station of claim 1 wherein said sausage producing machines each have a chuck within a twister housing adjacent a linking means, a stuffing tube, power means associated with said twister housing for rotating a strand of sausage extruded from said stuffing tube, and a looper horn located downstream from said linking means and adapted to deposit said strand on the hooks of a sausage conveyor, power means associated with the looper horns of each machine wherein the looper horns of one machine can rotate only in a clockwise direction and the looper horn of the other machine can rotate only in a counter-clockwise direction.

7. The conveyor station of claim 4 wherein said sausage producing machines have a chuck within a twister housing adjacent a linking means, a stuffing tube with power means associated with said twister housing for rotating a strand of sausage extruded from said stuffing tube, and a looper horn located downstream from said linking means and adapted to deposit said strand on the hooks of a sausage conveyor, wherein the twister housing and chuck on one machine can rotate only in a clockwise direction, and the twister housing and chuck in the other machine can rotate only in a counterclockwise direction, and wherein looper horns of one machine can rotate only in a clockwise direction and the looper horn of the other machine can rotate only in a counter-clockwise direction.

8. A conveyor station for a pair of sausage producing machines, comprising, a pair of spaced substantially parallel sausage producing machines capable of discharging a rope of sausages through a discharge end thereof, a pair of spaced elongated substantially parallel conveyors having one end of each adjacent the discharge ends of said machines, with said conveyors having adjacent sides, said conveyors having a continuous conveyor assembly adapted to pick up and carry away the rope of sausage discharged from each machine, power means for rotating said conveyor assemblies, said conveyors being a mirror image of each other as viewed from above so as to permit each conveyor to be attended from an operating position in the space between said conveyors, said machines being a mirror image of each other as viewed from above, and each having a chuck within a twister housing adjacent a linking means, a power means associated with said twister housing and said chuck being adapted to rotate said sausage strand in either a clockwise or counter-clockwise direction.

9. A conveyor station for a pair of sausage producing machines, comprising, a pair of spaced substantially parallel sausage producing machines capable of discharging a rope of sausages through a discharge end thereof, a pair of spaced elongated substantially parallel conveyors having one end of each adjacent the discharge ends of said machines, with said conveyors having adjacent sides, said conveyors having a continuous conveyor assembly adapted to pick up and carry away the rope of sausage discharged from each machine, power means for rotating said conveyor assemblies, said conveyors being a mirror image of each other as viewed from above so as to permit each conveyor to be attended from an operating position in the space between said conveyors, said machines being a mirror image of each other as viewed from above, and each having a chuck within a twister housing adjacent a linking means, a stuffing tube, power means associated with said twister housing for rotating a strand of sausage extruded from said stuffing tube, and a looper horn located downstream from said linking means and adapted to deposit said strand on the hooks of a sausage conveyor, and power means associated with said looper horn and being adapted to rotate the looper horn in either a clockwise or counter-clockwise direction.

10. A conveyor station for a pair of sausage producing machines, comprising, a pair of spaced substantially parallel sausage producing machines capable of discharging a rope of sausages through a discharge end thereof, a pair of spaced elongated substantially parallel conveyors having one end of each adjacent the discharge ends of said machines, with said conveyors having adjacent sides, said conveyors having a continuous conveyor assembly adapted to pick up and carry away the rope of sausage discharged from each machine, power means for rotating said conveyor assemblies, said conveyors being a mirror image of each other as viewed from above so as to permit each conveyor to be attended from an operating position in the space between said conveyors, said machines being a mirror image of each other as viewed from above, said sausage producing machines having a chuck within a twister housing adjacent a linking means, a stuffing tube with power means associated with said twister housing for rotating a strand of sausage extruded from said stuffing tube, and a looper horn located downstream from said linking means and adapted to deposit said strand on the hooks of a sausage conveyor, power means associated with said looper horn and being adapted to rotate the looper horn in either a clockwise or counter-clockwise direction, the power means associated with said twister housing and said chuck being adapted to rotate said sausage strand in either a clockwise or counter-clockwise direction.

11. A conveyor station for a pair of sausage producing machines, comprising, a pair of spaced substantially parallel sausage producing machines capable of discharging a rope of sausages through a discharge end thereof, a pair of spaced elongated substantially parallel conveyors having one end of each adjacent the discharge ends of said machines, with said conveyors having adjacent sides, said conveyors having a continuous conveyor assembly adapted to pick up and carry away the rope of sausage discharged from each machine, power means for rotating said conveyor assemblies, said conveyors being a mirror image of each other as viewed from above so as to permit each conveyor to be attended from an operating position in the space between said conveyors, said machines being a mirror image of each other as viewed from above, said sausage producing machines having a chuck within a twister housing adjacent a linking means, power means associated with the twister housing and chuck of each machine wherein the twister housing and chuck on one machine can rotate only in a clockwise direction, and the twister housing and check in the other machine can rotate only in a counter-clockwise direction.

12. A conveyor station for a pair of sausage producing machines, comprising, a pair of spaced substantially parallel sausage producing machines capable of discharging a rope of sausages through a discharge end thereof, a pair of spaced elongated substantially parallel conveyors having one end of each adjacent the discharge ends of said machines, with said conveyors having adjacent sides, said conveyors having a continuous conveyor assembly adapted to pick up and carry away the rope of sausage discharged from each machine, power means for rotating said conveyor assemblies, said conveyors being a mirror image of each other as viewed from above so as to permit each conveyor to be attended from an operating position in the space between said conveyors, said machines being a mirror image of each other as viewed from above, said sausage producing machines having a chuck within a twister housing adjacent a linking means, a stuffing tube, power means associated with said twister housing for rotating a strand of sausage extruded from said stuffing tube, and a looper horn located downstream from said linking means and adapted to deposit said strand on the hooks of a sausage conveyor, power means associated with the looper horns of each machine wherein the looper horns of one machine can rotate only in a clockwise direction and the looper horn of the other machine can rotate only in a counter-clockwise direction.

13. A conveyor station for a pair of sausage producing machines, comprising, a pair of spaced substantially parallel sausage producing machines capable of discharging a rope of sausages through a discharge end thereof, a pair of spaced elongated substantially parallel conveyors having one end of each adjacent the discharge ends of said machines, with said conveyors having adjacent sides, said conveyors having a continuous conveyor assembly adapted to pick up and carry away the rope of sausage discharged from each machine, power means for rotating said conveyor assemblies, said conveyors being a mirror image of each other as viewed from above so as to permit each conveyor to be attended from an operating position in the space between said conveyors, said machines being a mirror image of each other as viewed from above, said sausage producing machines having a chuck within a twister housing adjacent a linking means, a stuffing tube with power means associated with said twister housing for rotating a strand of sausage extruded from said stuffing tube, and a looper horn located downstream from said linking means and adapted to deposit said strand on the hooks of a sausage conveyor, wherein the twister housing and chuck on one machine can rotate only in a clockwise direction, and the twister housing and chuck in the other machine can rotate only in a counter-clockwise direction, and wherein looper horns of one machine can rotate only in a clockwise direction and the looper horn of the other machine can rotate only in a counter-clockwise direction.

* * * * *